United States Patent
Xu et al.

[19]

[11] Patent Number: 6,033,145
[45] Date of Patent: Mar. 7, 2000

[54] STEERING WHEEL ATTACHMENT APPARATUS

[75] Inventors: Xiao Ping Xu, Troy; Erik A. Banks, Utica, both of Mich.

[73] Assignee: Breed Automotive Technology, Inc., Lakeland, Fla.

[21] Appl. No.: 09/122,567

[22] Filed: Jul. 25, 1998

[51] Int. Cl.[7] ........................................... F16B 2/14
[52] U.S. Cl. .................. 403/256; 403/359.5; 403/374.3; 74/552
[58] Field of Search ............................. 403/378, 379.4, 403/247, 254, 373, 374.1, 374.2, 374.3, 355, 359.1, 359.5, 256, 257, 260; 74/552; 280/731, 728.1, 728.2, 779

[56] References Cited

U.S. PATENT DOCUMENTS

| | | | |
|---|---|---|---|
| 1,489,264 | 4/1924 | May | 74/552 |
| 3,438,664 | 4/1969 | Meyer | 403/374.2 |
| 3,831,973 | 8/1974 | Meacham | 280/150 |
| 4,721,008 | 1/1988 | Stoops et al. | 74/552 |
| 5,087,069 | 2/1992 | Corbett et al. | 280/731 |
| 5,383,682 | 1/1995 | Nagata et al. | 280/777 |
| 5,419,585 | 5/1995 | Breed et al. | 280/731 |
| 5,480,184 | 1/1996 | Young | 280/731 |
| 5,584,501 | 12/1996 | Walters | 280/728.2 |
| 5,584,503 | 12/1996 | Lutz | 280/728.1 |
| 5,588,337 | 12/1996 | Milton | 74/552 |
| 5,615,910 | 4/1997 | Margatak et al. | 280/731 |
| 5,676,396 | 10/1997 | Föhl | 280/731 |
| 5,692,769 | 12/1997 | Scharboneau et al. | 280/728.2 |
| 5,768,948 | 6/1998 | Hosoi et al. | 74/552 |
| 5,816,112 | 10/1998 | Hosoi et al. | 74/552 |
| 5,897,132 | 4/1999 | Papandreou | 280/728.2 |

FOREIGN PATENT DOCUMENTS

| | | |
|---|---|---|
| 414245A1 | 9/1991 | European Pat. Off. . |
| 706929B1 | 4/1996 | European Pat. Off. . |
| 2242871 | 10/1991 | United Kingdom . |
| 2282352 | 4/1995 | United Kingdom . |
| WO97/09206 | 3/1997 | WIPO . |

*Primary Examiner*—Harry C. Kim
*Attorney, Agent, or Firm*—L. R. Drayer; B. Vrioni

[57] ABSTRACT

The present invention relates generally to a method for attaching a steering wheel to a steering column. In a preferred embodiment, the attachment apparatus comprises a steering wheel armature having a collar for receiving a steering column. Preferably, the steering column includes a tapered portion adjacent a slotted portion, which is located between a flange and the tapered portion. The steering wheel armature is placed on the steering column with the flange and slot portion extending through the collar and above the steering wheel armature. A wedge having a ramped portion that surrounds a slot, which has a width adapted to accommodate the slotted portion of the steering column, is driven in a direction which forces the ramped portion underneath the flange of the steering column. The driving of the wedge forces the steering wheel armature against the tapered portion of the steering column and forms a wedge lock between the steering wheel armature collar and the steering column tapered portion.

2 Claims, 6 Drawing Sheets

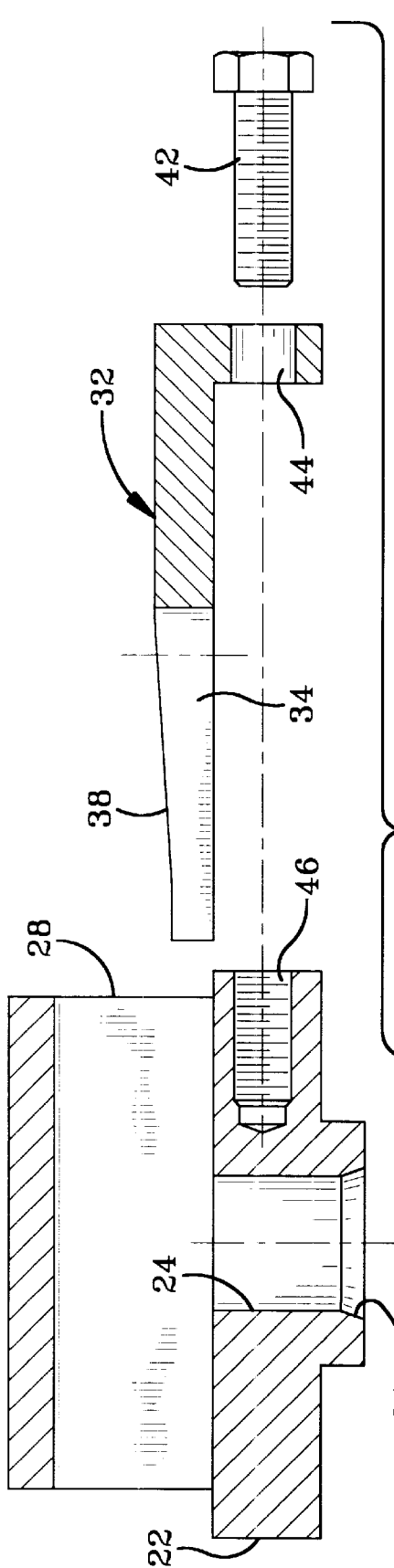
FIG-5
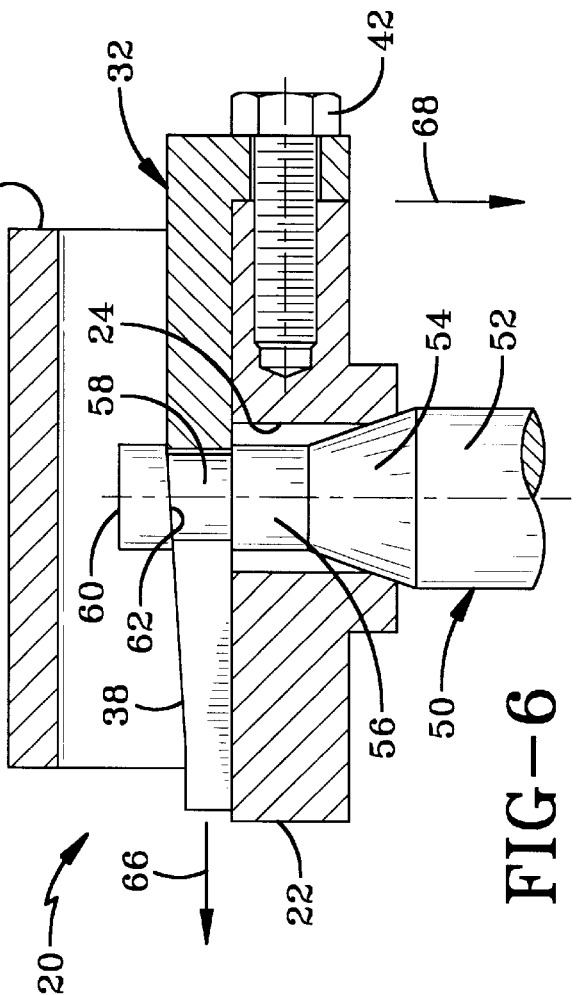
FIG-6
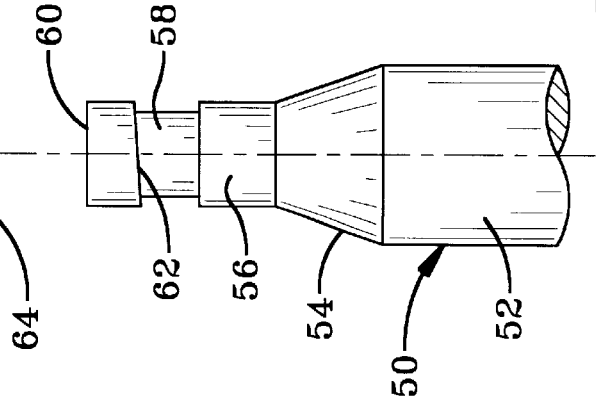

ས6,033,145

STEERING WHEEL ATTACHMENT APPARATUS

BACKGROUND OF THE INVENTION

This invention relates generally to an apparatus for attaching a steering wheel to a steering column.

Typically, a steering wheel and a steering column do not come as a pre-assembled unit. Often a steering wheel is manufactured by a different supplier than the steering column. Thus, it is necessary to provide an apparatus for attaching the steering wheel to the steering column. Past attachment mechanisms have not been entirely satisfactory. In addition, the inclusion of air bag systems with steering wheels in a integrated steering wheel air bag system does not permit the use of traditional methods for attaching a steering wheel to a steering column. In an integrated steering wheel air bag system the air bag portion of the system is mounted into the steering wheel prior to attachment of the steering wheel to the steering column.

One difficulty with the use of past attachment mechanisms with an integrated steering wheel air bag system is that the traditional attachment mechanism is not accessible when an air bag module is mounted to the steering wheel. A second difficulty with past attachment mechanisms has been the requirement for complex tools to attach and to remove the steering wheel from the steering column. Finally, past methods have been very costly and have experienced difficulty in fitting the attachment apparatus within the allowable space.

Thus, it is desirable to provide an attachment apparatus that permits a user to reproducibly secure a steering wheel to a steering column whether an air bag module is mounted to the steering wheel or not. It is furthermore desirable to provide an apparatus that is simpler in design than current attachment mechanisms.

SUMMARY OF THE INVENTION

In general terms, this invention provides an attachment apparatus for attaching a steering wheel to a steering column using a wedge.

In a preferred embodiment, the attachment apparatus comprises a steering wheel having a steering wheel armature. The steering wheel armature includes a collar that is adapted to receive a steering column. The attachment apparatus additionally includes a wedge having a slot and a ramped portion adjacent to the slot. The slot is adapted to receive a slot portion of a steering column. The ramped portion of the wedge is adapted to contact a flange on a steering column. The wedge is movable relative to the steering wheel armature between an unlocked position and a locked position. The wedge is adapted to form a wedge lock between the collar and a steering column when the wedge is in the locked position. Preferably, the apparatus further includes a fastening means for securing the wedge to the steering wheel armature.

In a second embodiment, the attachment apparatus attaches a steering wheel to a steering column. The steering column includes a tapered portion, a slot portion, and a flange adjacent to the slot portion. The steering wheel includes a steering wheel armature having a collar for receiving the steering column. The attachment apparatus further includes a wedge having a slot and a ramped portion adjacent to the slot. The slot receives the slot portion and the ramped portion contacts the flange. The wedge is movable relative to the steering wheel armature between an unlocked position and a locked position. The wedge forms a wedge lock between the collar and the tapered portion when the wedge is in the locked position.

These and other features and advantages of this invention will become more apparent to those skilled in the art from the following detailed description of the presently preferred embodiment. The drawings that accompany the detailed description can be described as follows.

BRIEF DESCRIPTION OF THE DRAWINGS

FIG. 5 is an exploded partial cross sectional view of the embodiment shown in FIG. 1 with the wedge at an unlocked position;

FIG. 6 is a partial cross sectional view of the embodiment shown in FIG. 1 fully assembled with the wedge at a locked position;

DETAILED DESCRIPTION OF THE PREFERRED EMBODIMENT

Figure 1:
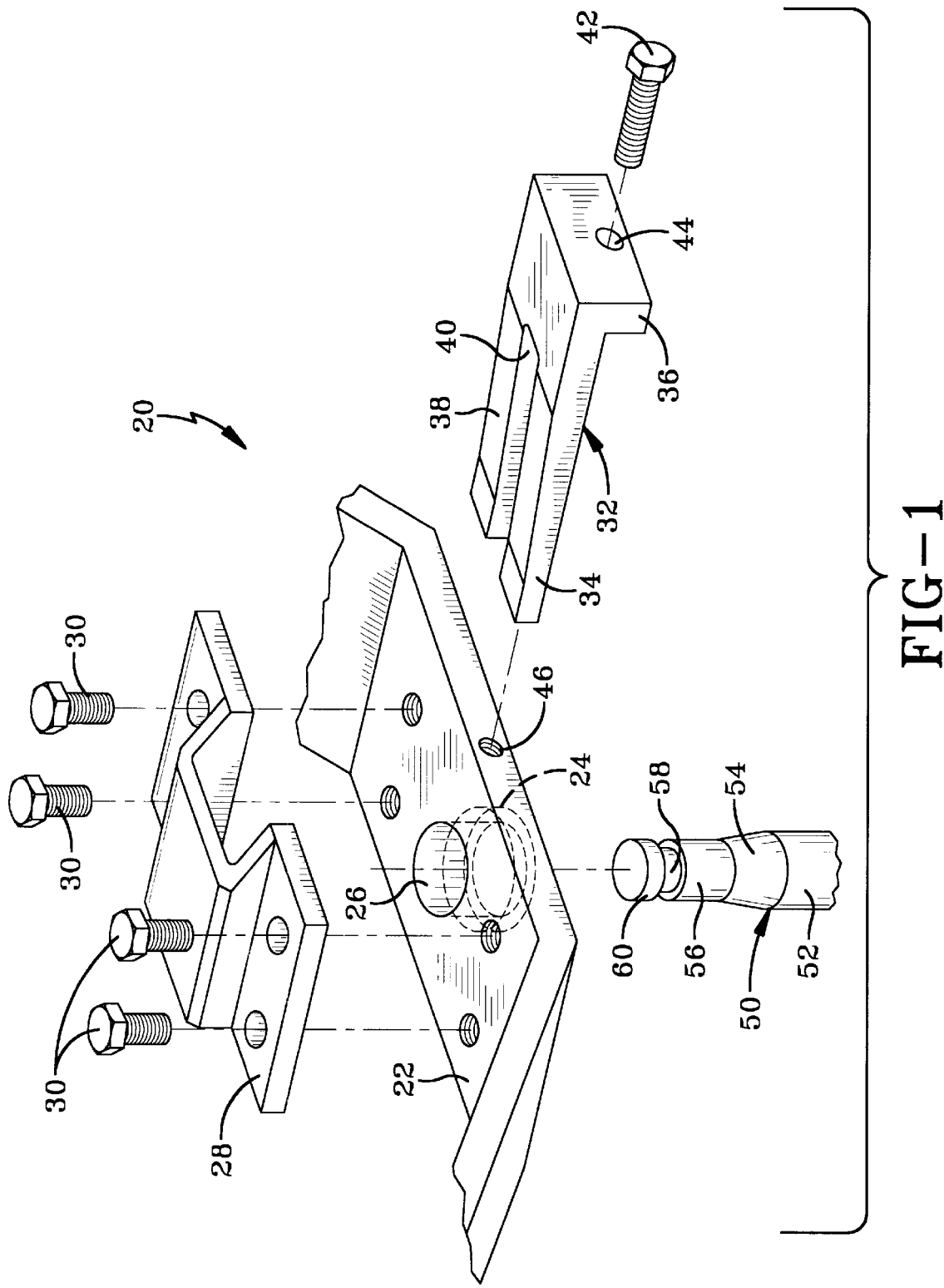
FIG. 1 is an exploded view of one embodiment of a steering wheel attachment apparatus designed according to the present invention.

An attachment apparatus designed according to the present invention is shown generally at 20 in FIG. 1. A steering wheel armature 22 includes a collar 24, shown in phantom, having an aperture 26. As is known in the art, the steering wheel armature 22 is generally connected to a plurality of spokes (not shown) and a steering wheel rim (not shown) to form the steering wheel. Preferably, steering wheel armature 22 is a part of an integrated steering wheel as is known in the art. A wedge bracket 28 is secured by a plurality of bolts 30 to the steering wheel armature 22. Wedge bracket 28 could also be secured to steering wheel armature 22 by other methods known in the art such as, for example, welding. The wedge bracket 28 overlays collar 24. Preferably, collar 24 is integral with and formed from steering wheel armature 22.

Attachment apparatus 20 further includes a wedge 32. Wedge 32 preferably is an L-shaped wedge having a long leg 34 and a short leg 36. A ramped portion 38 is located on the upper surface of long leg 34. A slot 40 is formed in long leg 34 of wedge 32. Ramped portion 38 surrounds slot 40. A fastener 42 extends through hole 44 and into threaded hole 46 to secure wedge 32 to steering wheel armature 22. Preferably, fastener 42 comprises a threaded bolt as is shown in FIG. 1.

A steering column 50 is adapted to extend through collar 24 by means of aperture 26 in steering wheel armature 22. Steering column 50 has a lower section 52, a tapered portion 54, and an upper section 56. A slot portion 58 and a flange 60 are located on steering column 50 above upper section 56. The width of slot portion 58 is designed to be slightly less than the width of slot 40. Thus, slot portion 58 can be accommodated in slot 40.

Figure 2:
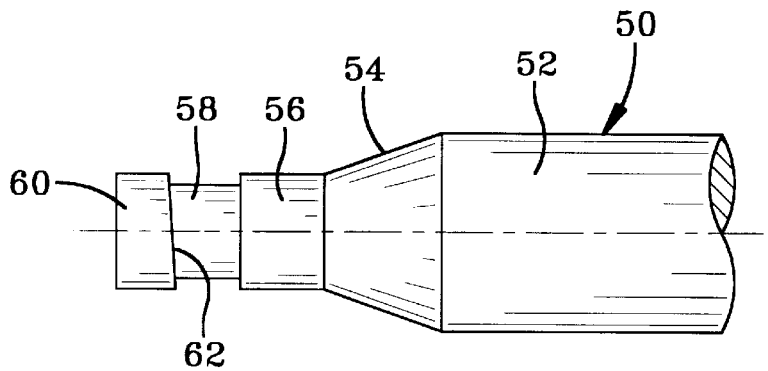
FIG. 2 is a side view of one embodiment of a steering column designed according to the present invention.

FIG. 2 is a side view of steering column 50. Flange 60 includes a ramped surface 62 adjacent slot portion 58. The angle of ramped surface 62 preferably is nearly identical to the angle of ramped portion 38 of wedge 32. The diameter of lower section 52 is larger than the diameter of aperture 26 in collar 24. The diameter of upper section 56 is less than the diameter of aperture 26 in collar 24.

Figure 3:
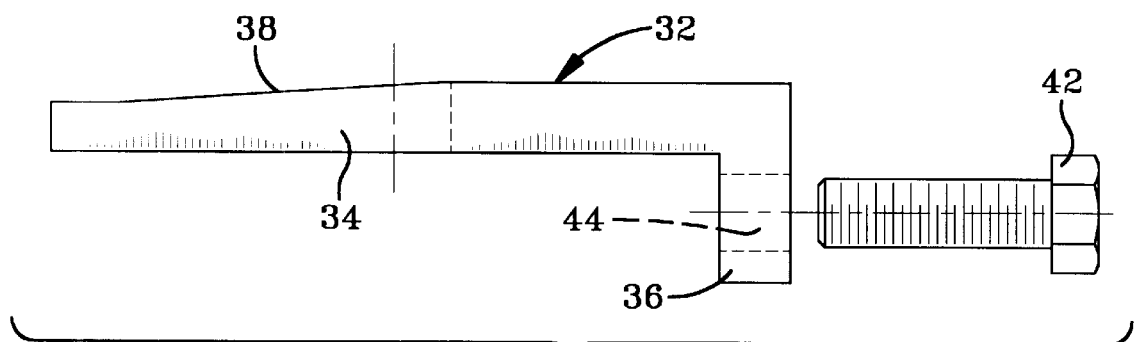
FIG. 3 is a side view of one embodiment of a wedge and a fastener designed according to the present invention.
Figure 4:
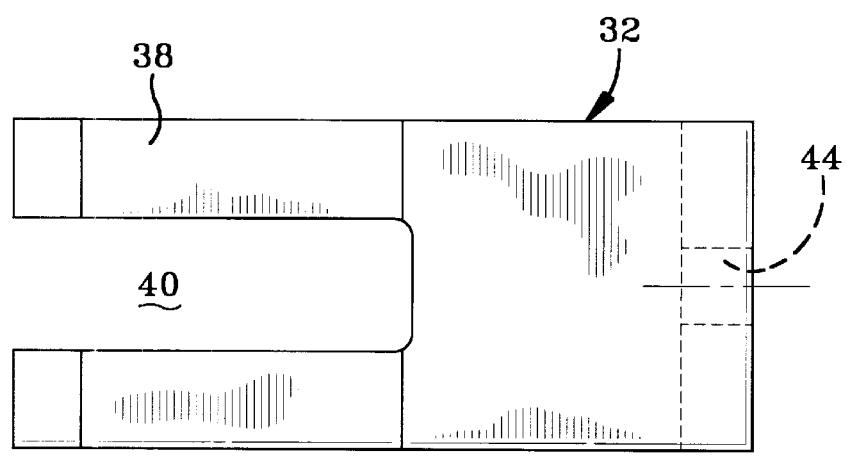
FIG. 4 is a top plan view of the wedge shown in FIG. 3.

FIG. 3 is a side view of wedge 32 and fastener 42. FIG. 4 is a top plan view of wedge 32. As shown in FIGS. 3 and 4, slot 40 extends the length of ramped portion 38.

FIG. 5 is an exploded partial cross-sectional view of attachment apparatus 20 with wedge 32 at an unlocked position. Optionally, collar 24 includes an inner taper 64 having an angle nearly identical to that of tapered portion 54. As would be understood by one of ordinary skill in the art, collar 24 need not include inner taper 64.

FIG. 6 is a partial cross-sectional side view of attachment apparatus 20 with wedge 32 at a locked position. The sequence of steps in fully assembling attachment apparatus 20 are as follows. First, steering wheel armature 22 with attached wedge bracket 28 is placed onto steering column 50. Steering column 50 extends through collar 24. Second, wedge 32 is placed onto steering wheel armature 22 and slot 40 is aligned to accommodate slot portion 58. In this position, wedge 32 is in the unlocked position. Third, wedge 32 is driven in the direction of arrow 66. As wedge 32 is driven in the direction of arrow 66, ramped surface 62 of flange 60 rides up ramped portion 38 of wedge 32. At the same time, steering wheel armature 22 is driven in the direction of arrow 68. This movement drives inner taper 64 against tapered portion 54 of steering column 50. When wedge 32 is at the locked position, as shown in FIG. 6, ramped surface 62 is near an upper end of ramped portion 38 and short leg 36 of wedge 32 is nearly flush against steering wheel armature 22. At the locked position, wedge 32 forms a wedge lock between collar 24 and tapered portion 54 of steering column 50. The wedge lock forms because the diameter of lower section 52 is larger than the diameter of collar 24, thus inner taper 64 wedges against tapered portion 54. Fourth, fastener 42 is inserted through hole 44 and threaded hole 46 to secure wedge 32 to steering wheel armature 22. Thus, steering wheel armature 22 is secured to steering column 50.

In disassembling attachment apparatus 20, first, fastener 42 is removed. Second, wedge 32 is driven in a direction opposite to that of arrow 66. Third, to disengage the wedge lock between collar 24 and tapered portion 54, long leg 34 is placed between the top of flange 60 and wedge bracket 28 and wedge 32 is then driven in the direction of arrow 66. Driving wedge 32 in the direction of arrow 66 disengages collar 24 from tapered portion 54.

Figure 7:
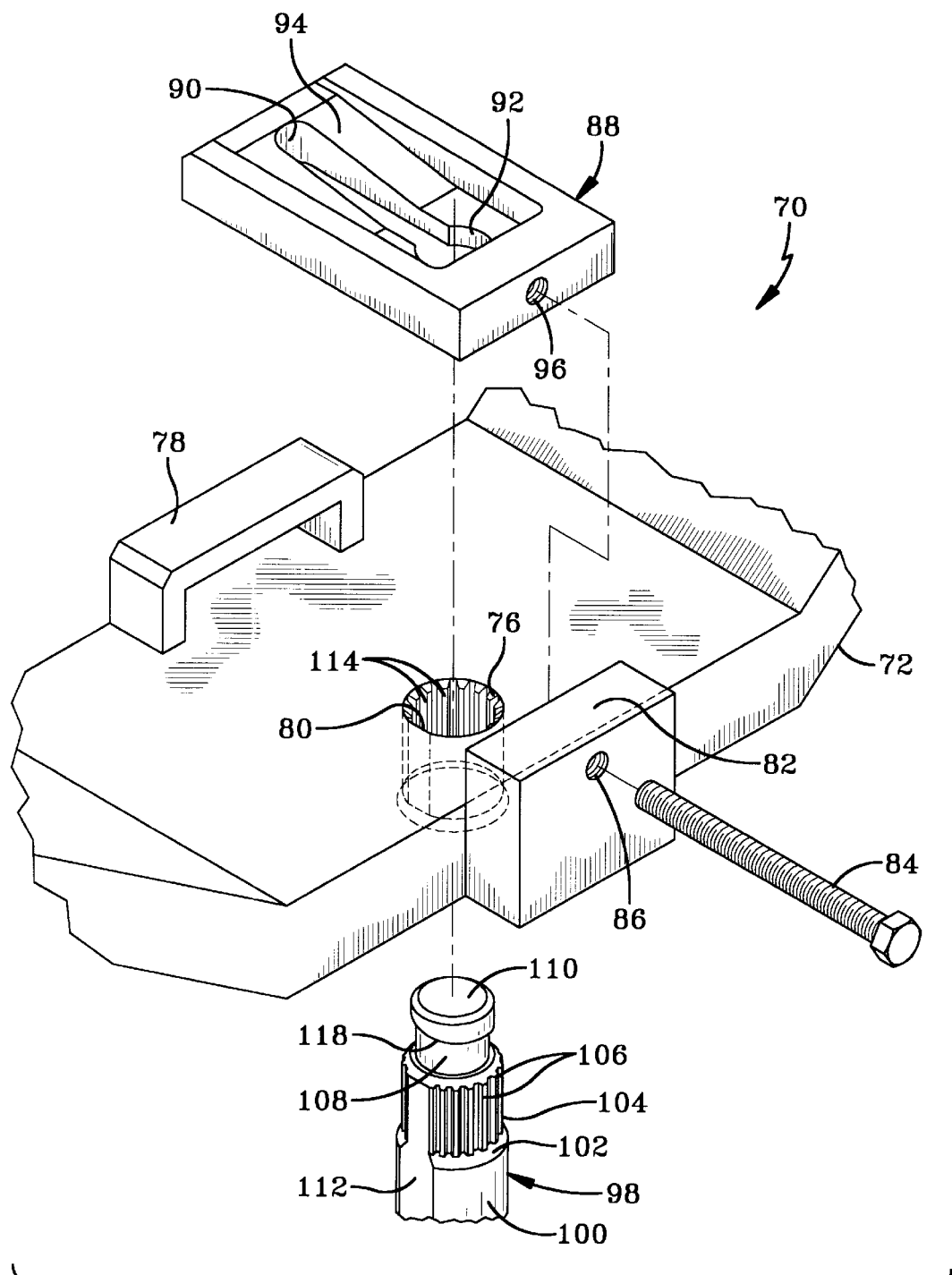
FIG. 7 is an exploded view of another embodiment of a steering wheel attachment apparatus and a steering column designed according to the present invention.

A second embodiment of an attachment apparatus is shown generally at 70 in FIG. 7. A steering wheel armature 72 includes a collar 74 having an aperture 76. As noted above, steering wheel armature 72 is generally connected to a plurality of spokes (not shown) and an upper steering wheel rim (not shown) to form the steering wheel. Preferably, steering wheel armature 72 is a part of an integrated steering wheel as is known in the art. A wedge guide 78 is attached to steering wheel armature 72. As would be understood by one of ordinary skill in the art, wedge guide 78 may also be integral with steering wheel armature 72. Collar 74 preferably includes an index surface 80. A drive bracket 82 is located on steering wheel armature 72 opposite wedge guide 78. A drive bolt 84 is adapted to extend through an aperture 86 in drive bracket 82. Aperture 86 is oversized to permit drive bolt 84 to move freely in an axial direction through aperture 86.

A wedge 88 is designed to fit between wedge guide 78 and steering wheel armature 72. Wedge 88 includes a slot 90 that is connected to an aperture 92. A ramped portion 94 surrounds slot 90. Wedge 88 further includes a drive bolt aperture 96 for receiving drive bolt 84. Aperture 96 is threaded to accept drive bolt 84.

A steering column 98 is adapted to extend through collar 74. Steering column 98 includes a lower section 100 adjacent a tapered portion 102, which is adjacent an upper section 104. The diameter of lower section 100 is larger than the diameter of collar 74. A plurality of splines 106 are located on upper section 104. A slot portion 108 of steering column 98 is located adjacent upper section 104. A flange 110 is located adjacent slot portion 108. An index surface 112 is located on upper section 104. The contour of index surface 112 permits it to fit against index surface 80. Thus, index surface 80 and index surface 112 serve to orient steering wheel armature 72 relative to steering column 98. Flange 110 is adapted to pass through aperture 82. Slot portion 108 has a width that is less than the width of slot 90, thus slot portion 108 can fit into slot 90.

Figure 8:
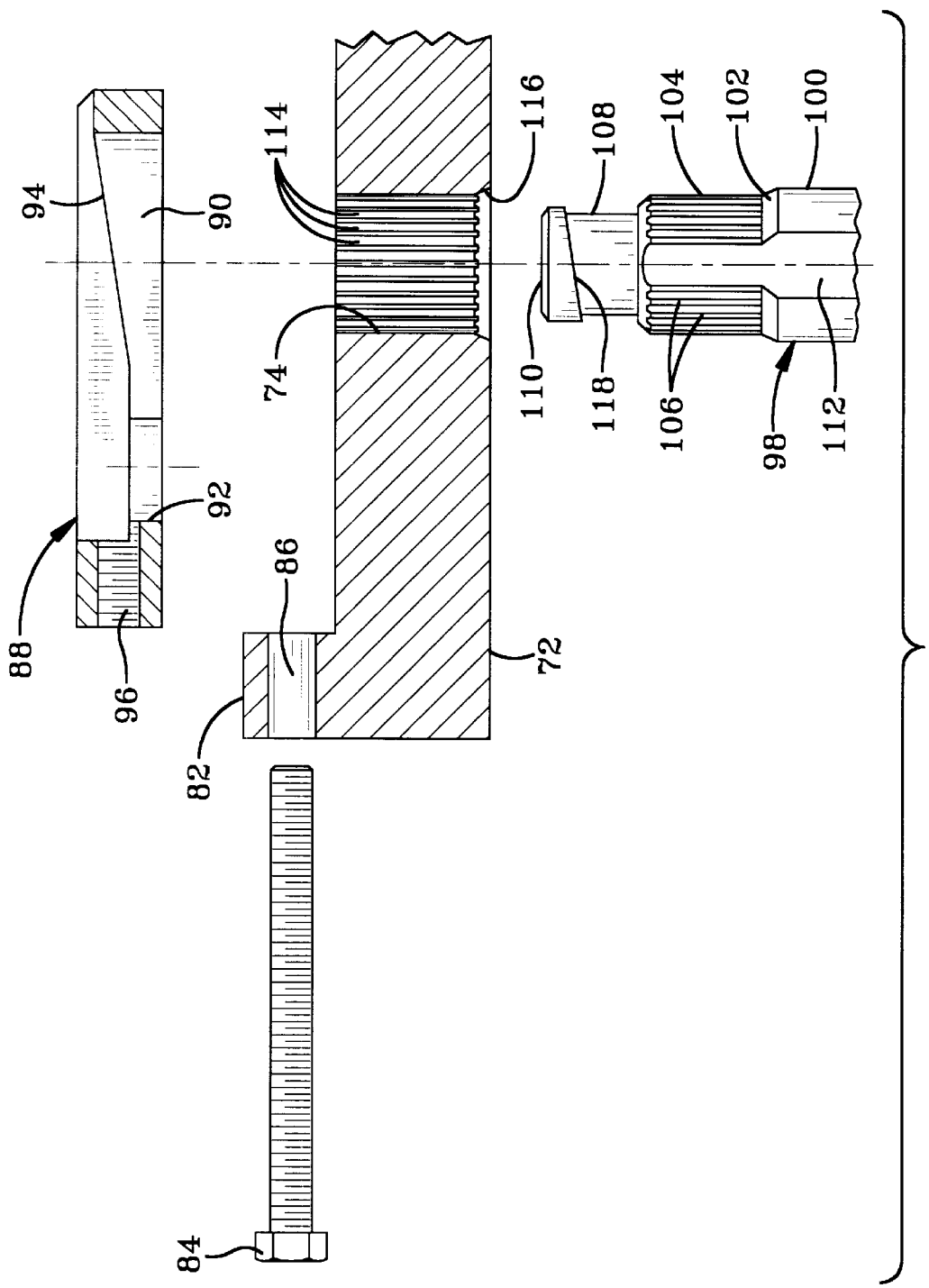
FIG. 8 is a partial cross sectional view of the embodiment shown in FIG. 7 with a wedge at an unlocked position.

FIG. 8 is a partial cross-sectional view of the embodiment shown in FIG. 7 with wedge 88 at an unlocked position. Collar 74 further includes a plurality of keyways 114 that are complimentary to splines 106 on steering column 98. As will be understood by one of ordinary skill in the art, alternatively, splines 106 could be located within collar 74 and keyways 114 could be located on steering column 98. The splines 106, keyways 114, and index surfaces 80 and 112 all serve to orient the steering wheel armature 72 relative to steering column 98 and serve as antirotation mechanisms. As would be understood by one of ordinary skill in the art the splines 106 and keyways 114 could be replaced by other anti-rotation mechanisms such as, for example, a double-D system of two sets of matching flat index surfaces, or the steering column 98 and collar 74 could have a non circular shape such as, for example, a hexagonal shape. When steering column 98 extends through collar 74, splines 106 and keyways 114 prevent rotation of steering wheel armature 72 independently from steering column 98. Preferably, collar 74 includes a taper 116 having an angle that is substantially similar to that of tapered portion 102. Flange 110 further includes a ramped surface 118. Preferably, the angle of ramped surface 118 matches that of ramped portion 94.

Figure 9:
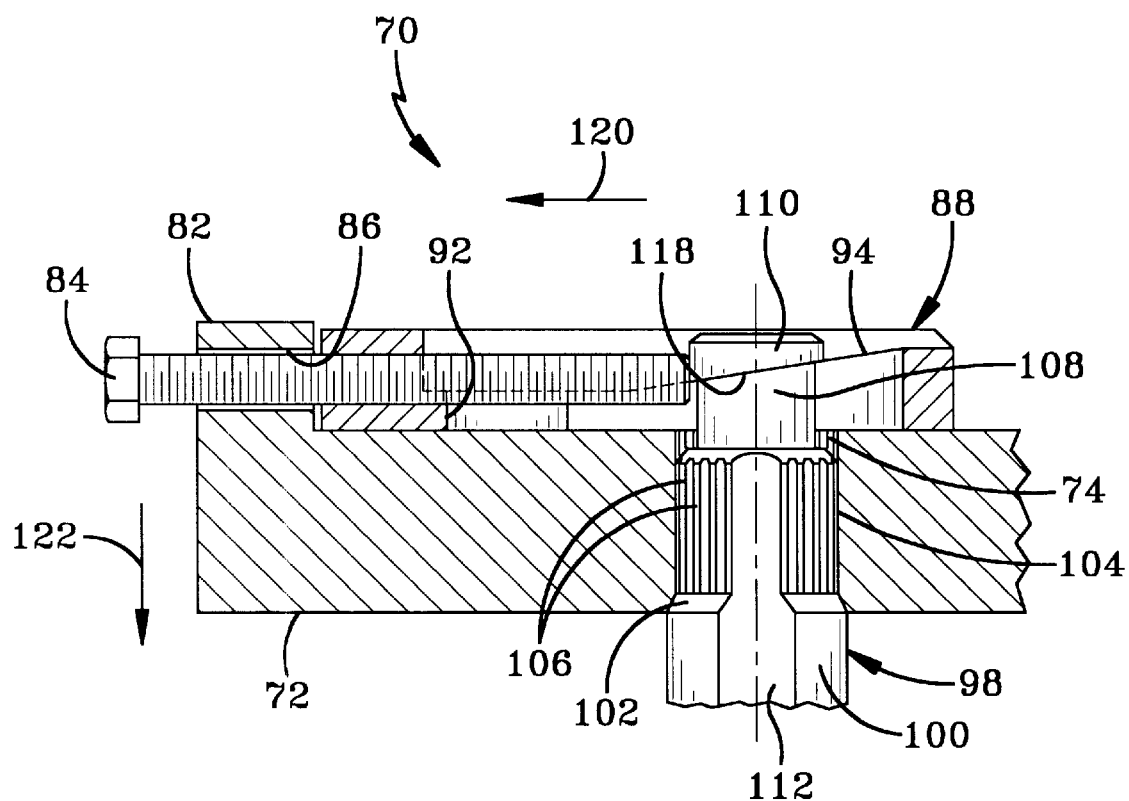
FIG. 9 is a partial cross sectional view of the embodiment shown in FIG. 7 fully assembled with the wedge at a locked position.

In FIG. 9, attachment apparatus 70 is shown fully assembled. Wedge 88 is shown at a locked position. The steps of assembly of attachment apparatus 70 are as follows. First, wedge 88 is placed on steering wheel armature 72 with aperture 92 centered over collar 74. Second, drive bolt 84 is inserted through aperture 86 and threaded into drive bolt aperture 96. Third, steering wheel armature 72 is placed onto steering column 98, with slot portion 108 and flange 110 extending through aperture 92 in wedge 88. Indexed surfaces 112 and 80 are aligned with each other as are keyways 114 and splines 106. Fourth, drive bolt 84 is rotated until it contacts flange 110. Further rotation of drive bolt 84 moves wedge 88 in the direction of arrow 120. As drive bolt 84 is further rotated, ramped surface 118 rides up ramped portion 94 of wedge 88. Further rotation of drive bolt 84 drives steering wheel armature 72 in the direction of arrow 122 to force collar 74 against tapered portion 102. Preferably, drive bolt 84 is rotated to a pre-determined torque to provide a reproducible and secure attachment of steering wheel armature 72 to steering column 98. At the pre-determined torque, a wedge-like lock is formed between collar 74 and tapered portion 102 and wedge 88 is at the locked position.

In disassembling attachment apparatus 70, the first step is removal of drive bolt 84. Second, wedge 88 is driven from underneath flange 110. Third, steering wheel armature 72 is driven in a direction opposite arrow 122 to disengage the wedge-like lock between collar 74 and tapered portion 102.

The present invention has been described in accordance with the relevant legal standards, thus the foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

We claim:

1. An attachment apparatus for attaching a steering wheel to a steering column, said apparatus comprising:

a steering wheel armature having a collar, said collar adapted to receive said steering column;

a wedge having a slot and a ramped portion adjacent said slot, said slot adapted to receive a slot portion of said steering column, said ramped portion adapted to contact a flange on said steering column;

said wedge movable relative to said steering wheel armature between an unlocked position and a locked position;

said wedge adapted to form a wedge lock between said collar and said steering column when said wedge is at said locked position;

a drive bracket and a drive bolt, said drive bracket connected to said steering wheel armature and receiving said drive bolt; and said drive bolt received in a threaded aperture in said wedge, wherein rotation of said drive bolt moves said wedge between said unlocked position and said locked position.

2. An attachment apparatus for attaching a steering wheel to a steering column, said apparatus comprising:

a steering wheel armature and a wedge;

said steering column including a tapered portion, a slot portion and a flange adjacent said slot portion;

said steering wheel armature having a collar for receiving said steering column;

said wedge having a slot and a ramped portion adjacent said slot, said slot for receiving said slot portion and said ramped portion for contacting said flange;

said wedge movable relative to said steering wheel armature between an unlocked position and a locked position;

said wedge forming a wedge lock between said collar and said tapered portion when said wedge is at said locked position;

a drive bracket and a drive bolt;

said drive bracket connected to said steering wheel armature and receiving said drive bolt;

said drive bolt received in a threaded aperture in said wedge; and rotation of said drive bolt moving said wedge between said unlocked position and said locked position.

* * * * *